(12) United States Patent
Austin

(10) Patent No.: US 7,156,441 B2
(45) Date of Patent: Jan. 2, 2007

(54) TAILGATE COUNTERBALANCING HINGE

(75) Inventor: Donald Mossom Austin, Perkinsfield (CA)

(73) Assignee: M & C Corporation, Sterling Heights, MI (US)

( * ) Notice: Subject to any disclaimer, the term of this patent is extended or adjusted under 35 U.S.C. 154(b) by 0 days.

(21) Appl. No.: 11/032,387

(22) Filed: Jan. 10, 2005

(65) Prior Publication Data

US 2005/0194808 A1  Sep. 8, 2005

Related U.S. Application Data

(63) Continuation of application No. PCT/US04/06262, filed on Mar. 2, 2004, which is a continuation of application No. 10/386,884, filed on Mar. 12, 2003, now Pat. No. 6,796,592.

(51) Int. Cl.
 *B62D 33/033* (2006.01)

(52) U.S. Cl. ............ 296/57.1; 296/59; 16/75; 16/308; 49/386; 49/389

(58) Field of Classification Search ............ 296/57.1, 296/59, 146.1; 16/75, 308; 49/386, 389
See application file for complete search history.

(56) References Cited

U.S. PATENT DOCUMENTS

| | | | |
|---|---|---|---|
| 2,395,456 A | 2/1946 | Bunker | |
| 2,733,476 A | 2/1956 | Eck | |
| 2,799,891 A | 7/1957 | Ragsdale | |
| 2,810,153 A | 10/1957 | Semar | |
| 2,984,517 A | 5/1961 | Farrow et al. | |
| 3,031,225 A | 4/1962 | Saffer et al. | |
| 3,085,286 A | 4/1963 | Whitehouse et al. | |
| 3,122,775 A | 3/1964 | Pulleyblank | |
| 3,146,847 A | 9/1964 | Rutman et al. | |
| 3,166,783 A | 1/1965 | Mackie et al. | |
| 3,336,070 A * | 8/1967 | Jackson | 296/57.1 |
| 3,370,317 A | 2/1968 | Marchione | |
| 3,402,508 A | 9/1968 | Kessler | |
| 3,643,378 A | 2/1972 | Velavicius et al. | |
| 3,649,067 A | 3/1972 | Louton, Jr. | |
| 3,695,678 A | 10/1972 | Gergoe | |
| 3,699,716 A | 10/1972 | Wanlass | |
| 3,787,923 A | 1/1974 | Peterson | |
| 4,143,904 A | 3/1979 | Cooper et al. | |
| 4,291,501 A | 9/1981 | Steinberg et al. | |
| 4,378,658 A | 4/1983 | DeLorean | |
| 4,589,164 A | 5/1986 | Leonard | |
| 4,701,977 A * | 10/1987 | Hori et al. | 16/266 |
| 4,702,511 A * | 10/1987 | Olins | 296/57.1 |
| 4,787,809 A | 11/1988 | Zroslik | |

(Continued)

OTHER PUBLICATIONS

International Search Report for International Application No. PCT/US2004/006262, mailed Apr. 8, 2004.

(Continued)

*Primary Examiner*—Lori L. Coletta
(74) *Attorney, Agent, or Firm*—Nixon & Vanderhye PC

(57) ABSTRACT

A tailgate counterbalancing hinge assembly includes a linear torque rod, a first end assembly and a second end assembly. One end assembly pivotally retains the tailgate while permitting the torque rod to be rigidly coupled to the tailgate for movement with the tailgate about a pivot axis. The other end assembly pivotally retains the tailgate and permits the end of the torque rod o be rigidly retained with respect to the vehicle body. The assemblies are easily mounted in the vehicle using brackets that are secured to the tailgate and a vehicle body hinge pin to simplify installation and repair of the assembly.

23 Claims, 3 Drawing Sheets

U.S. PATENT DOCUMENTS

| | | | |
|---|---|---|---|
| 4,845,811 A | 7/1989 | Fargnier | |
| 4,905,347 A | 3/1990 | Worth | |
| 5,039,154 A | 8/1991 | Lewis | |
| 5,358,301 A * | 10/1994 | Konchan et al. | 296/146.1 |
| D370,453 S | 6/1996 | Shortman et al. | |
| 5,606,773 A | 3/1997 | Shappell | |
| 5,641,262 A | 6/1997 | Dunlop et al. | |
| 5,787,549 A * | 8/1998 | Soderlund | 16/308 |
| 5,988,724 A * | 11/1999 | Wolda | 296/57.1 |
| 6,283,463 B1 | 9/2001 | Park | |
| 6,769,729 B1 | 8/2004 | Bruford et al. | |
| 6,793,263 B1 | 9/2004 | Bruford et al. | |

OTHER PUBLICATIONS

Written Report for International Application No. PCT/US2004/006262, mailed Apr. 8, 2004.

* cited by examiner

TAILGATE COUNTERBALANCING HINGE

CROSS-REFERENCE TO RELATED APPLICATIONS

This application is a continuation of International Application No. PCT/US04/06262, filed on Mar. 2, 2004, which is a continuation of U.S. application Ser. No. 10/386,884, filed Mar. 12, 2003, now U.S. Pat. No. 6,796,592 B1.

BACKGROUND OF THE INVENTION

The present invention relates to vehicle body closure panels, in which a torque rod with end assemblies forms a counterbalanced pivot connection between a tailgate and vehicle body pillars, the counterbalance biasing the torque rod to an unbiased tailgate position permitting tailgate removal from the vehicle body.

Vehicle body closure members, such as a tailgate, are pivotally mounted between body side panels forming the pillars at the rear of the vehicle. The tailgate pivots about a hinge axis between a horizontal, open position and a vertical, closed position. The mounting assemblies for the tailgate permit the tailgate to be removed. For example, the tailgate may include hinge pins that extend outwardly along the hinge axis that removably connect into brackets carried on the vehicle body. When the tailgate is pivoted to a predetermined intermediate position between open and closed, at least one of the hinge pins slips through a slot in the connecting bracket as the tailgate is lifted at one end from the truck body.

Several known tailgate mounting assemblies include a spring bias for assisting movement and counterbalancing the weight of a tailgate during opening and closing movements. In one example, a torque rod provides spring biasing between the tailgate and the vehicle body side pillars. Disadvantageously, the torque rod forms a portion of the pivot assembly and, therefore, is typically pre-installed into the tailgate before mounting the tailgate between the side pillars. This complicates the assembly procedure. Moreover, the torque rod may require particularly configured ends that complicate production of the parts before assembly.

Another known tailgate uses hinge pin trunions for pivoting, and the torque rod is preformed and installed into the tailgate in a complex and intricate procedure. For example, during assembly of the tailgate, one end of the rod has to be aligned with an aperture that exposes the end for attachment outside of the tailgate while the other end is aligned with a reinforcement plate located inside the tailgate. All of the aligning must be performed while the torque rod is carried within the interior of the tailgate and the procedure may be difficult and time consuming. Moreover, numerous auxiliary components are required to assemble the torque rod to the tailgate.

Other types of springs that are used in place of the torque rod are difficult to install within the confines of tailgates made of inner and outer panels that are joined together before the hinge assembly is mounted. Moreover, such assemblies may be difficult to repair and replacement parts are complex and expensive.

There is a need for a simplified tailgate hinge mechanism that is less complex and less laborious to install. This invention addresses these needs and provides enhanced capabilities while avoiding the shortcomings of the prior art.

SUMMARY OF THE INVENTION

A tailgate counterbalancing hinge includes a torque rod having first and second end assemblies, at least one of the end assemblies being readily attachable to and removable from the torque rod. The first end assembly includes a first support for pivotally carrying the tailgate adjacent to a body side panel. The first support includes a cup, and a retainer bushing pivotally received by said cup. The bushing includes a stem for locking said bushing with respect to the tailgate. The second end assembly includes a second support for pivotally carrying a tailgate adjacent to an opposite body panel. The second support includes a key and a spriget that combines the key with a mounting stem for securing the key to the body panel. A pivot body includes a slot aligned for reception of the key. A bushing is received in an opening in said tailgate and carries the pivot body. The torque rod has a first end securely received in the first end assembly for movement with the bushing, and a second end securely received in the second end assembly by the pivot body.

In one example, the torque rod includes a faceted cross-section at least at one end. The cross-section may be longitudinally continuous for ease of manufacture of the torque rod or may be formed only on parts of the rod.

One example method for assembling a selectively removable tailgate between vehicle body panels receiving a first end of the torque rod in a retainer bushing with a faceted cross-section receiver, receiving a second end of the torque rod in a cup with a faceted cross-section receiver, retaining the retainer bushing with respect to the tailgate, and retaining the cup by slidably receiving the cup with respect to a spriget fixed to a body pillar. By sliding the retainer bushing over a spriget's key, fixed to the vehicle body pillar, the pillar pivotally supports a retainer bushing.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
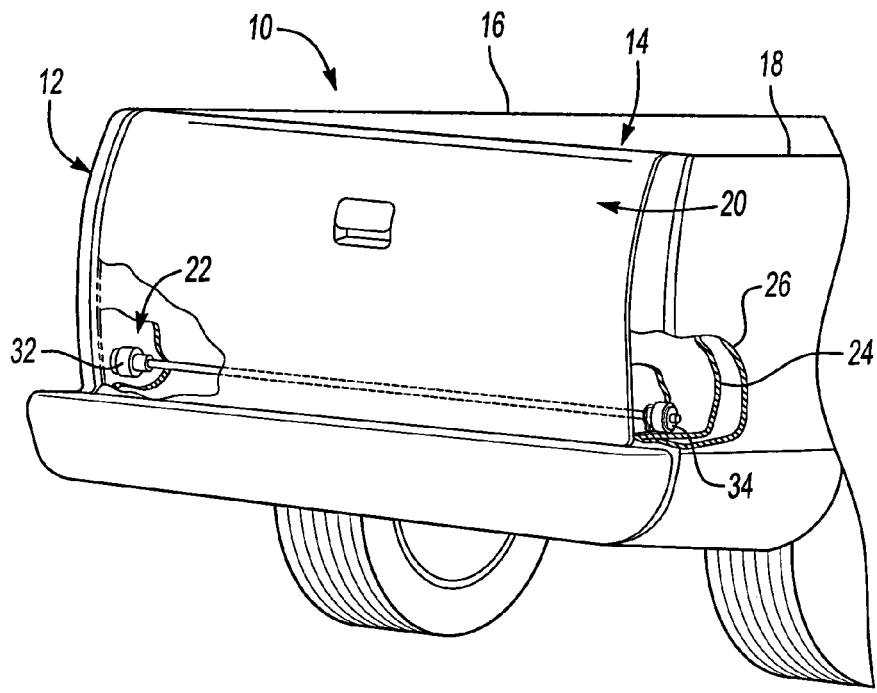
FIG. 1 shows a perspective view of a vehicle having a tailgate assembly.

Referring to FIG. 1, an example motor vehicle 10 is shown having a vehicle body 12 that includes a rear compartment or bed 14 enclosed by side panels 16 and 18 as well as a tailgate 20. A counterbalance hinge assembly 22 pivotally supports the tailgate 20 between the side panels 16 and 18 in a manner to be described in greater detail below.

The tailgate 20 is pivotally supported between pillars formed by the side panels 16 and 18. In the example shown, side panels 16 and 18 and the tailgate 20 are formed by respective inner and outer panels 24 and 26 of sheet metal joined at the ends by overlapping flanges or the like. In other examples, other materials may be used in constructing the side panels 16 and 18 and the tailgate 20.

The example counterbalance hinge assembly 22 includes a torque rod 30, which is linear and aligned along a pivotal axis between the side panels 16 and 18. The torque rod 30 carries first and second end assemblies 32 and 34. The first and second end assemblies 32 and 34 enable the torque rod 30 to be secured with respect to the tailgate 20 at one end, and with respect to the side panels 16 and 18 at a second end.

Figure 2:
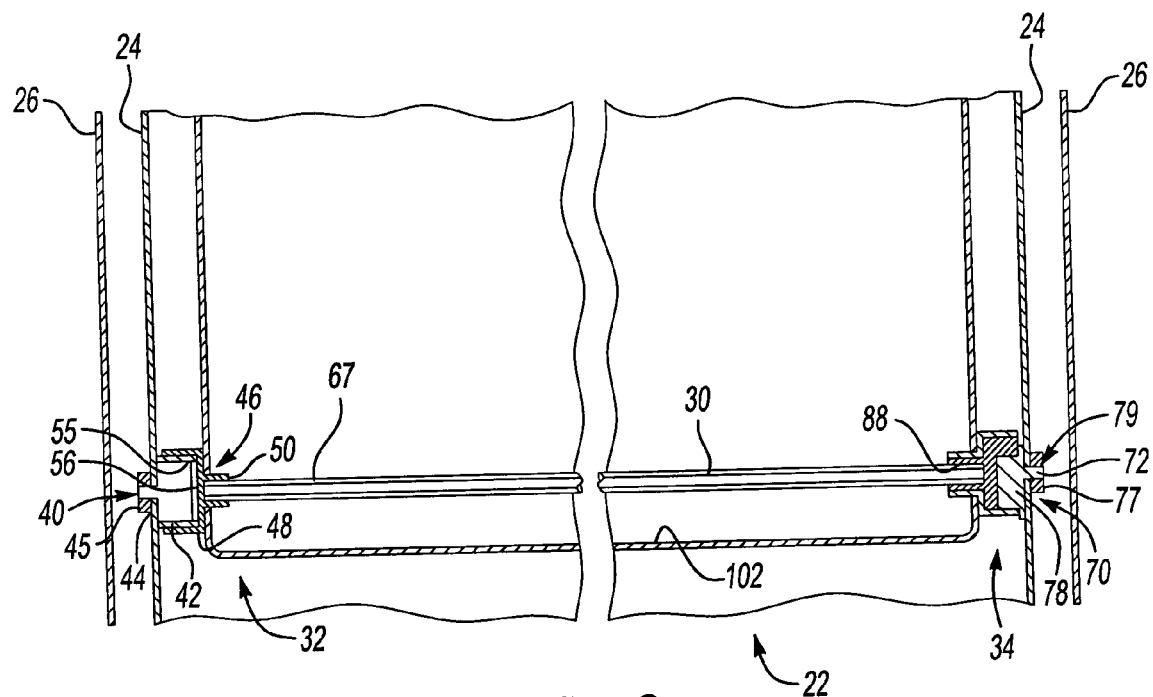
FIG. 2 shows a cross-sectional view of selected portions of an example hinge assembly.

In the example shown in FIG. 2, the first end assembly 32 pivotably supports the tailgate 20 at the left body pillar including inner panel 24. The first end assembly 32 forms a left side vehicle hinge pin that includes a pivot member 40 having a cylindrical boss 42 and a mounting stem 44. The mounting stem 44 secures the pivot member 40 to the vehicle pillar at the inner panel 24. In one example, the stem 44 may be a square housing received in a square opening in the inner panel 24 of the left side panel 16, and secured in position by welds, adhesive or other fasteners. In other examples, the stem 44 may include a threaded member that is received in a weld nut 45 mounted on a surface of the inner panel 24.

The first end assembly 32 receives an end of the torque rod to be secured to the tailgate 20. This connection includes a bushing 46, which is pivotally or rotatably received about the cylindrical boss 42. In one example, the bushing 46 includes a cylindrical receptacle 48 and a stem 50. The stem 50 includes an exterior configuration that is faceted to be retained in an opening 52 in a tailgate wall 23 of the tailgate 20. As used herein, a facet refers to any cross-section having at least one surface discontinuity that prevents rotation within a correspondingly shaped, compatible piece. In other examples, the bushing 46 is welded or otherwise attached to the tailgate wall 23.

One example stem 50 is modified or faceted to mount to the tailgate 20.

In another example, the surface of the receptacle 48 may fit in an enlarged opening in the tailgate wall 23 aligned with the pivotal axis and extending through a portion of the tailgate wall 23. The receptacle 48, or the stem 50 may be configured exteriorly or otherwise fastened to avoid relative rotation between the bushing 46 and tailgate wall 23 so that the bushing 46 that receives the torque rod pivots with the tailgate 20.

Figure 3:
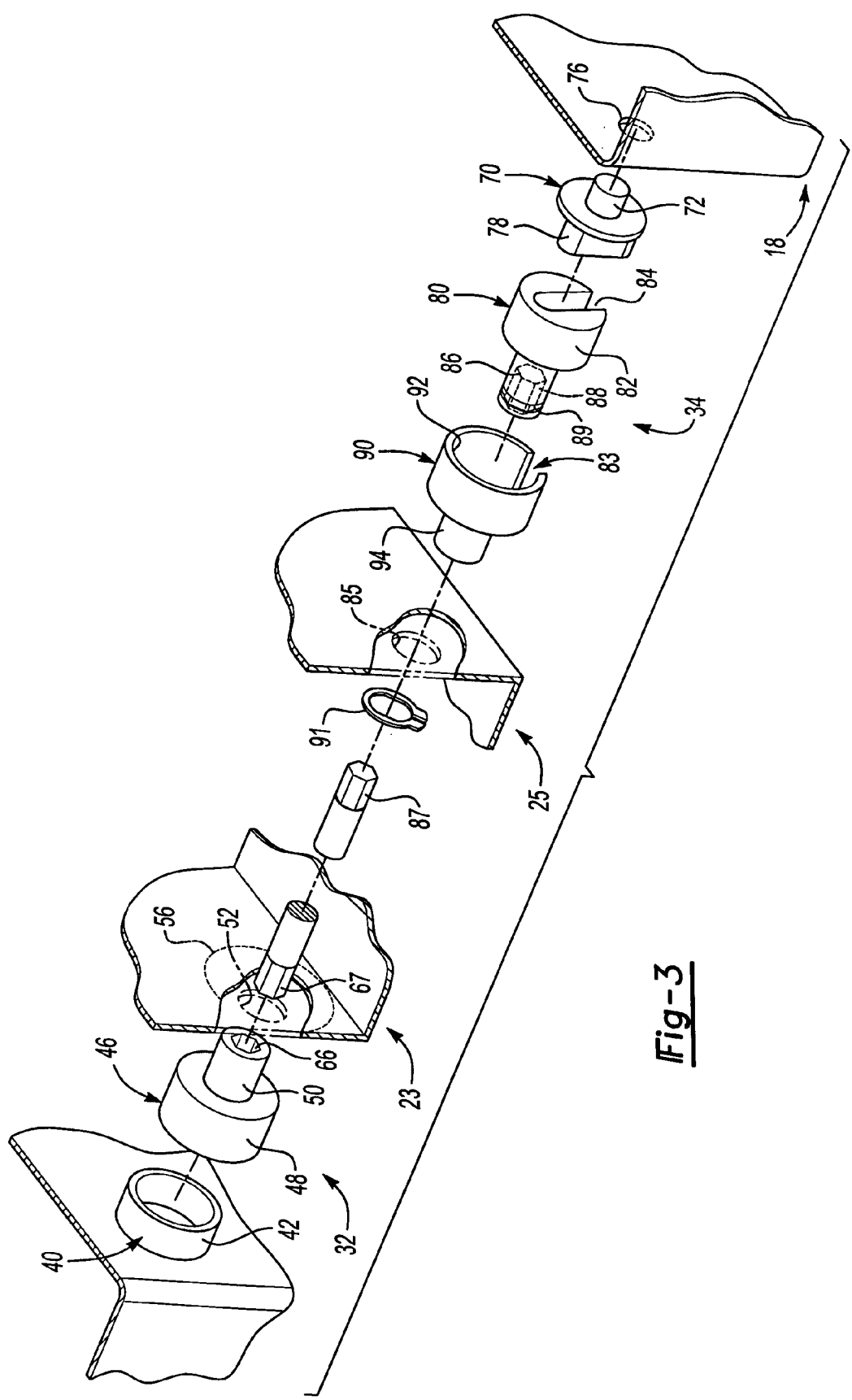
FIG. 3 shows an exploded view of the hinge assembly of FIG. 2.

FIG. 3 illustrates an exploded view of the example counterbalance hinge assembly 22 of FIG. 2. The stem 50 includes a chamber 66 that receives an end portion of the torque rod 30. The end portion is faceted and corresponds to the chamber 66 as shown to lock the bushing 46 to the torque rod 30. In one example, the torque rod 30 comprises a hexagonal shaft end and the opening 66 is compatibly configured to avoid relative rotation between the bushing 46 and the torque rod end 67.

The second end assembly 34 includes a vehicle hinge pin for pivotally carrying the tailgate 20 adjacent to the right side panel 18 and includes a spriget 70. The spriget 70 combines a key 78 with a mounting stem 72 for securing the key 78 to the right hand side panel 18. The mounting stem 72 is received in an opening 76. A fastener such as nut 77 (FIG. 2) or the like may be used to fasten the stem 72 to the side panel 18. The key 78 has an elongated shape, the elongated shape being aligned in a direction intermediate the vertical, closed and the horizontal, open positions of the tailgate 20 to define a removal direction along the elongated axis of the key body 78. The key 78 is received in the slot 83 of a bushing 90 and in the slot 84 of the pivot body 80.

The second end assembly 34 also includes a pivot body 80 having a cylindrical body 82 with a radial slot 84 aligned for reception of the key 78. The pivot body 80 includes a stem 86 having a chamber 88 adapted to receive and secure the right end 87 of the torque rod 30. The assembly 34 also includes a bushing 90 which can be mounted within an opening 85 of the tailgate wall 23. The bushing 90 includes a chamber 92 adapted to pivotally receive body 82 of the pivot body 80. In one example, the bushing 90 includes a stem 94 received in the correspondingly configured opening 85. The configuration of the opening 85 may non-rotatably retain the bushing 90 in the inner wall of the tailgate 20. The bushing 90 may be retained in the opening 85 by a retainer, for example, a snap ring 91 engaged in a groove on the stem 94. In one example, the stem 86 includes a groove 89 that receives a snap ring 91 at a position adjacent the end of stem 94.

When assembled, the right hand end 87 of the torque rod 30 is retained in a stationary position by the pivot body 80 passing through the bushing 90 mounted in the tailgate 20. The rigid connection to the body side panel 18 is made by the bracket 74 and spriget 70 as assembled as discussed above. The left hand end 67 of the torque rod 30 is retained by the tailgate wall 23 to move with the tailgate 20. Thus, as the tailgate 20 is moved between the upright, closed position and the horizontal, open position, the torque rod 30 twists.

In one example, the unbiased position of the torque rod 30 occurs when the tailgate 20 is aligned with the elongated axis of the key 78, whereby spring tension is introduced to pivot the tailgate 20 away from the closed position when it is unlatched, and to raise it to the closed position when it has been unlatched from its open position.

Figure 4:
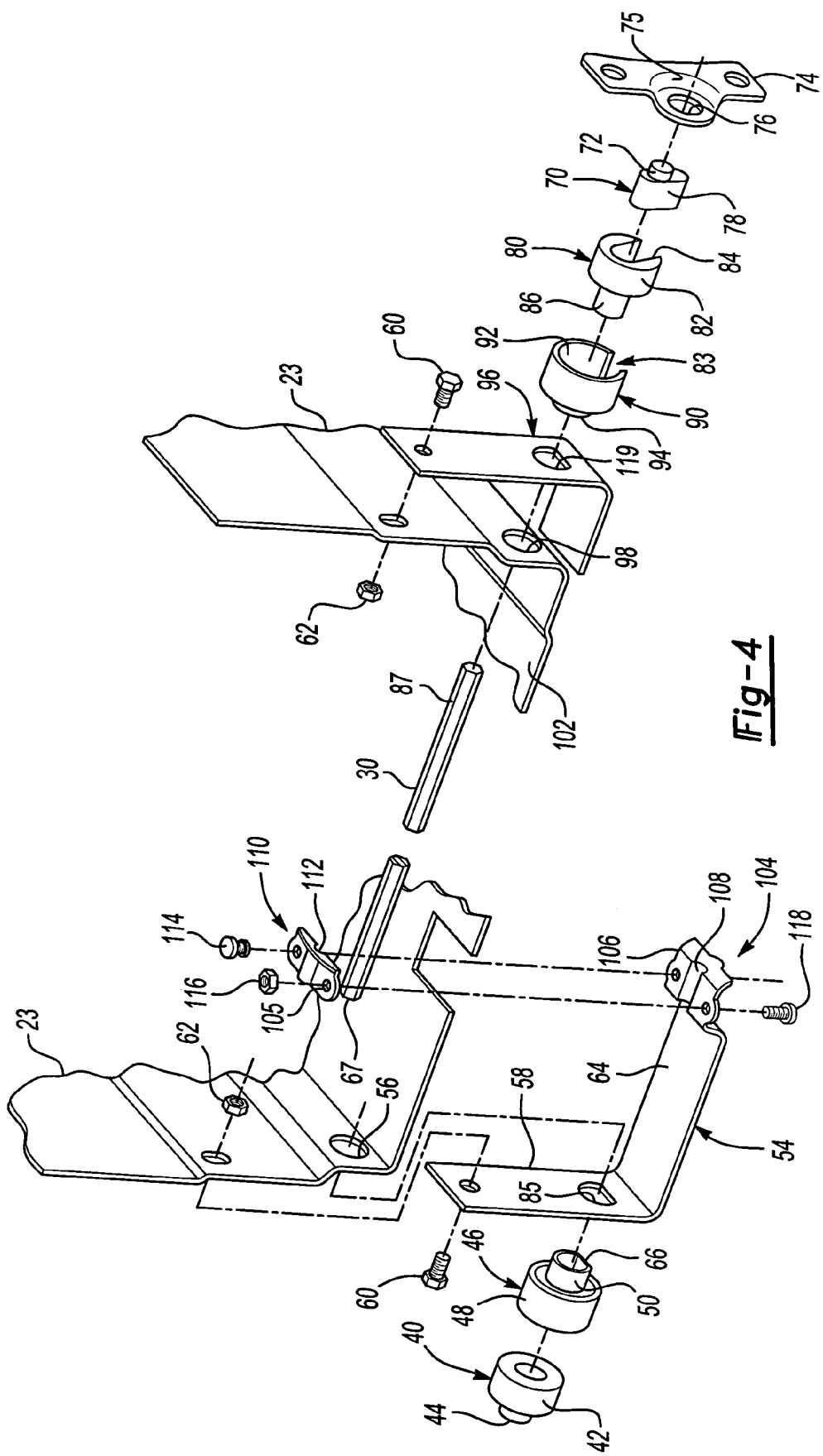
FIG. 4 shows an exploded view of selected portions of another example hinge assembly embodiment.

FIG. 4 is an exploded view of another example counterbalance hinge assembly 22 with demonstrates a modification that eases assembly and repair. The stem 50 of the bushing 46 is correspondingly sized to fit in the opening 85 of a tailgate panel attachment bracket 54. The attachment bracket 54 may provide the benefit of reinforcing the end panel of the tailgate and simplifying the formation of opening 52 that receives the bushing 46. Rather than trying to form a properly sized and configured opening 56 in the tailgate wall 23, the bracket 54 with opening 85 is placed next to an enlarged opening 56 in the tailgate wall 23. The openings 85 and 56 are aligned with the pivotal axis extending through the tailgate 20. In one example, an upper flange 58 is bolted to the tailgate wall 23 of the tailgate 20 with a bolt and nut 60 and 62. In other examples, welds or other fasteners secure the flange 58. The opening 85 is configured to avoid relative rotation between the stem 50 and the opening 56 such that when assembled, both the installation bracket 54 and the bushing 46 pivot with the tailgate 20.

The bracket 54 includes a releasable engagement clamp 104 on a flange 64 that is angled relative to the flange 58. The clamp 104 includes a clamp seat 106 raised up through the tailgate wall 23 to align the clamp 104 on the pivotal axis. In the example shown, the bracket 54 includes an offset arm, bent as shown, to provide a raised position for the clamp 104 above the plane of the flange 64.

The seat 106 includes a cavity 108 which is aligned with the pivotal axis extending through the opening 56 and the bushing 46. A clamping flange 110 includes a recess 112 configured in compliance with the faceted segment of the torque rod 30 such that clamping of the flange 110 against the clamping seat 106 rotationally fixes the torque rod 30 with respect to the bracket 54, and thus the tailgate 20.

The raising of the clamp 104 to align the axis of the torque rod 30 with the pivotal axis by the raised seat 106 provides room for fasteners, such as the head of a rivet extending through aligned apertures in the seat 106 and the flange 110. In one example, a single rivet 114 is used to retain one side of the flange 110 with the seat 106. On the opposite side, the flange 110 includes a weld nut 116 that threadably receives a fastener 118 extending from beneath the seat 106.

The opening 119 in a bracket 96 is aligned with opening 98, and mounted to the outside of the tailgate wall 23. The bushing 90 carried by the bracket includes a chamber 92 adapted to pivotally receive body 82 of the pivot body 80. In one example, the bushing 90 includes a stem 94 received in the correspondingly configured opening 119. The configuration of the opening 119 rotationally fixes the bushing 90 to the tailgate wall 23. As a result, the counterbalance hinge assembly 22 may provide the benefit of loose assembly, and thus can be positioned before spring tension is applied to the counterbalance hinge assembly 22.

In one example assembly method, brackets 54 and 96 are attached to the tailgate 20, by welding such that configured openings 85 and 119 align with the openings 52 and 98 in the tailgate wall 23. This may beneficially enable configured openings 85 and 119 to be preferably sized, shaped and positioned after the tailgate has been manufactured, and overcomes the difficulty of shaping, sizing and aligning the apertures of the original tailgate panel stampings. The fastener 118 is initially installed in a pre-production or fabrication assembly procedure, for example, and left loose for tightening at the assembly plant. At the assembly plant, the entire bracket 54 is secured by welding or other fastening means to the tailgate 20. An aperture at the bottom of the tailgate receives the clamp 104 of the bracket 54. The torque rod 30, carrying pivot body 80 at end 87, is positioned such that end 67 is inserted through opening 98 to extend across the vehicle body 12 through the tailgate 20 and into the faceted, complementary hole formed by the recesses 112 and 108. The torque rod 30 is inserted through the bushing 90, which is already attached to bracket 96 in a prior operation. The fastener 118 is then tightened to provide proper biasing between the vertical, closed and horizontal, open positions.

The assembly discussed above provides an assembly for simply removably mounting a closure member between spaced apart body side panels of a vehicle body by using a linear torque rod extending across the tailgate. The assemblies provide means for connecting the torque rod in driving engagement with the vehicle body hinge pin within the bushing and independently of the rotatable support of the bushing on the hinge pin. The illustrative examples permit the bushing 90 to be received laterally downwardly over at least a portion of the vehicle body hinge pin when the tailgate 20 is in the removal position. Accordingly, the torque rod 30 is twisted in tension when the closure member is pivoted to either the closed or open positions from the removal position. This tension provides a counterbalancing effort to assist with pivotal movement of the tailgate 20. The counterbalance hinge assembly 22 may permit facile removal of the closure member from the vehicle body when the closure member is in the removal position.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A hinge assembly for removably mounting a closure member between spaced apart body side panels of a vehicle body for movement about a pivotal axis between open, closed and removal positions comprising:

a pair of bushings secured at opposite ends of the closure member, said pair of bushings having an axis that is coincident with the pivotal axis;

a vehicle body hinge pin for mounting on each of the spaced apart body side panels and configured to rotatably support each of said pair of bushings thereon;

at least one of said pair of bushings including a slot that permits the one of said pair of bushings to engage at least a portion of said vehicle body hinge pin when the closure member is in the removal position;

a linear torque rod having a first end that is rotationally fixed relative to the spaced apart body side panels and a second end that is rotationally fixed relative to one of said pair of bushings, and said linear torque rod being twisted when the closure member is pivoted away from the removal position to produce a bias toward the removal position; and a securing member that secures said linear torque rod to the closure member to rotationally fix said second end of said linear torque rod relative to said one of said pair of bushings.

2. The assembly as recited in claim 1, wherein said securing member and said pair of bushings are secured to the closure member for movement with the closure member.

3. The assembly as recited in claim 2, wherein said securing member includes an opening that is coincident with the pivotal axis and receives said second end of said linear torque rod there through, said opening corresponding in shape to a cross-sectional shape of said second end.

4. The assembly as recited in claim 3, wherein said securing member includes a clamp, said clamp includes first and second clamping portions that clamp on said linear torque rod to rotationally fix said second end.

5. The assembly as recited in claim 4, wherein said first and second clamping portions form said opening.

6. The assembly as recited in claim 4, wherein said securing member includes a first and second walls that are angled relative to each other, and said first wall includes said opening and said second wall includes said clamp.

7. A tailgate counterbalancing hinge comprising:

a first end assembly including a support for pivotally carrying a tailgate adjacent to a body panel and rotationally fixing a torque rod, the support including a pivot member, and a retainer bushing pivotally received by said pivot member and including a stem locking member for locking said bushing with respect to the tailgate;

a second end assembly including a support for pivotally carrying the tailgate adjacent to an opposed body panel, the support including a key with a mount for securing said key to said opposed body panel, a pivot body having a receiver portion for reception of said key, at least one of said key or said receiver portion forms an angle relative to vertical such that when the tailgate is positioned at said angle said receiver receives said key, and a pivot bushing received in an opening in said tailgate and carrying said pivot body; and a torque rod having a first end secured for movement with said retainer bushing and a second end secured with respect to said pivot body.

8. The hinge as recited in claim 7, wherein said key mounts on said opposed body panel at an angle between 5° and 75° relative to vertical.

9. The hinge as recited in claim 7, wherein said receiver portion includes a receiver opening that forms an angle between 5° and 75° relative to vertical when the tailgate is in a vertical position.

10. The hinge as recited in claim 9, wherein said receiver opening corresponds in shape to said key such that when said key is received in said receiver opening said receiver and said key are rotationally locked with respect to each other about a pivotal axis of the tailgate.

11. A method for assembling a removable closure member between vehicle body pillars comprising the steps of:
(a) installing a linear torque rod along a pivotal axis of a closure member;
(b) rotationally fixing a first end of the linear torque rod with respect to the closure member;
(c) positioning the closure member along the pivotal axis at an angle between vertical and horizontal; and
(d) rotationally fixing a second end of the linear torque rod with respect to the vehicle body pillars while at the angle,
wherein the step (b) includes further comprising securing a clamp to the closure member and clamping the first end in the clamp.

12. The method as recited in claim 11, wherein the clamp includes an opening having a shape that corresponds to a cross-sectional shape of the linear torque rod and the step (a) includes inserting the linear torque rod through the opening to rotationally fix the linear torque rod about the pivotal axis.

13. The method as recited in claim 11, wherein the step (c) includes positioning the closure member along the pivotal axis at an angle between 5° and 75° relative to the vertical position.

14. A method for assembling a removable closure member between vehicle body pillars comprising the steps of:
(a) installing a linear torque rod along a pivotal axis of a closure member;
(b) rotationally fixing a first end of the linear torque rod with respect to the closure member;
(c) positioning the closure member along the pivotal axis at an angle between vertical and horizontal; and
(d) rotationally fixing a second end of the linear torque rod with respect to the vehicle body pillars while at the angle,
wherein the step (d) includes further comprising connecting a bushing to at least one end of the closure member, receiving a pivot member in the bushing, and rotationally fixing the pivot member relative to the vehicle body pillars.

15. The method as recited in claim 11, wherein the step (d) includes connecting the linear torque rod to the pivot member to rotationally fix the second end relative to the vehicle body pillars.

16. A hinge assembly for removably mounting a closure member between spaced apart body side panels of a vehicle body for rotation about a pivotal axis between open, closed and removal positions, the hinge assembly comprising:
a pair of bushings secured at opposite ends of the closure member;
a pair of vehicle body hinge pins, each of the hinge pins being mounted on a corresponding one of the spaced apart body side panels and being configured to rotatably support a corresponding one of the bushings thereon;
at least one of the bushings including a slot that permits the at least one bushing to engage a portion of said vehicle body hinge pin when the closure member is in the removal position;
a linear torque rod having a first end that is rotationally fixed relative to the spaced apart body side panels and a second end that is rotationally fixed relative to the closure member, the torque rod being twisted when the closure member is pivoted away from the removal position to produce a bias toward the removal position; and
a securing member that secures the second end of the torque rod to the closure member to rotationally fix the second end of the torque rod relative to the closure member, the first end of the torque rod being connected to one of the vehicle body hinge pins so as to be rotationally fixed relative to the spaced apart body side panels.

17. A tailgate counterbalancing hinge assembly for removably mounting a tailgate between spaced apart body side panels of a vehicle, the hinge assembly comprising:
a first end assembly including a first support for pivotally carrying a first end of the tailgate adjacent to a first body panel, the first support including a first pivot member mounted on the first body panel and a first bushing attached to the tailgate and pivotally supported by the first pivot member;
a second end assembly including a second support for pivotally carrying a second end of the tailgate adjacent to a second body panel, the second support including a key mounted on the second body panel, a second pivot body removably mounted on the key, and a second bushing attached to the tailgate and pivotally supported by the second pivot body; and
a torque rod including a first end rotationally secured to one of the body panels and a second end rotationally secured to the tailgate so that the torque rod is twisted when the tailgate is rotated.

18. The hinge assembly recited in claim 17, wherein the second pivot body includes a slot for receiving the key when the second pivot body is mounted on the key, at least one of the key or the slot forming an angle relative to a vertical such that when the tailgate is positioned at said angle the slot receives the key.

19. The hinge assembly of claim 17, wherein the first end assembly and the second end assembly further comprise a first attachment bracket and a second attachment bracket, respectively, that are attached to the tailgate.

20. The hinge assembly of claim 19, wherein one of the first or second attachment brackets includes a clamp for securing the second end of the torque rod to the tailgate.

21. The hinge assembly of claim 20, wherein the clamp includes a seat that is aligned with a pivotal axis of the tailgate and a flange engaging the seat for clamping the second end of the torque rod to the clamp.

22. The hinge assembly of claim 20, wherein the clamp is part of an offset arm included in the first or second attachment bracket including the clamp.

23. The hinge assembly of claim 21, wherein the flange is configured in compliance with a faceted segment of the second end of the torque rod.

* * * * *